May 24, 1927.  
F. S. CARTWRIGHT  
1,629,654  
AUTOMATIC GEAR SHIFT FOR AUTOMOBILES  
Filed Nov. 6, 1925  5 Sheets-Sheet 3
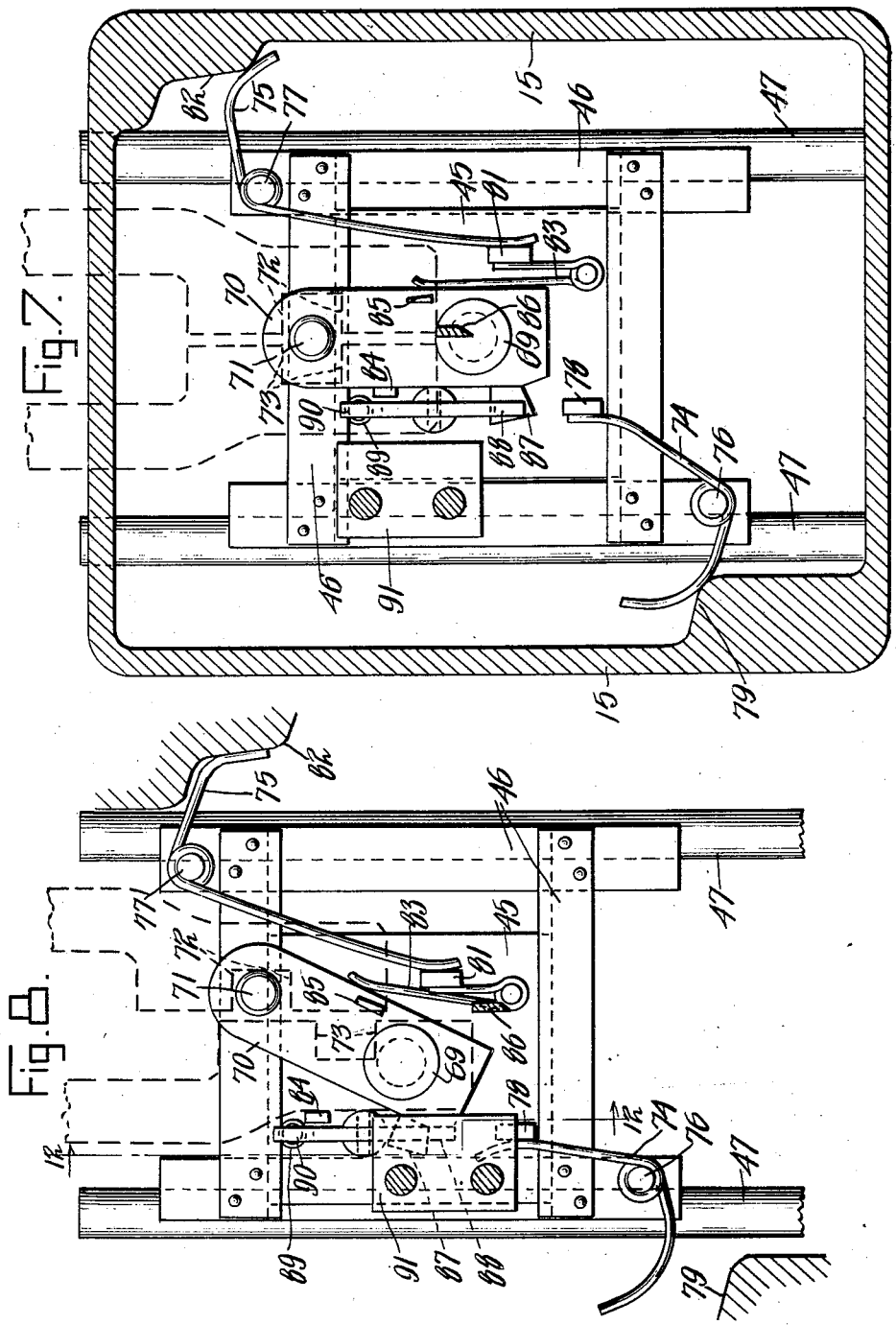
INVENTOR  
*Forest S. Cartwright*  
BY  
ATTORNEY May 24, 1927.
F. S. CARTWRIGHT
1,629,654
AUTOMATIC GEAR SHIFT FOR AUTOMOBILES
Filed Nov. 6, 1925    5 Sheets-Sheet 4
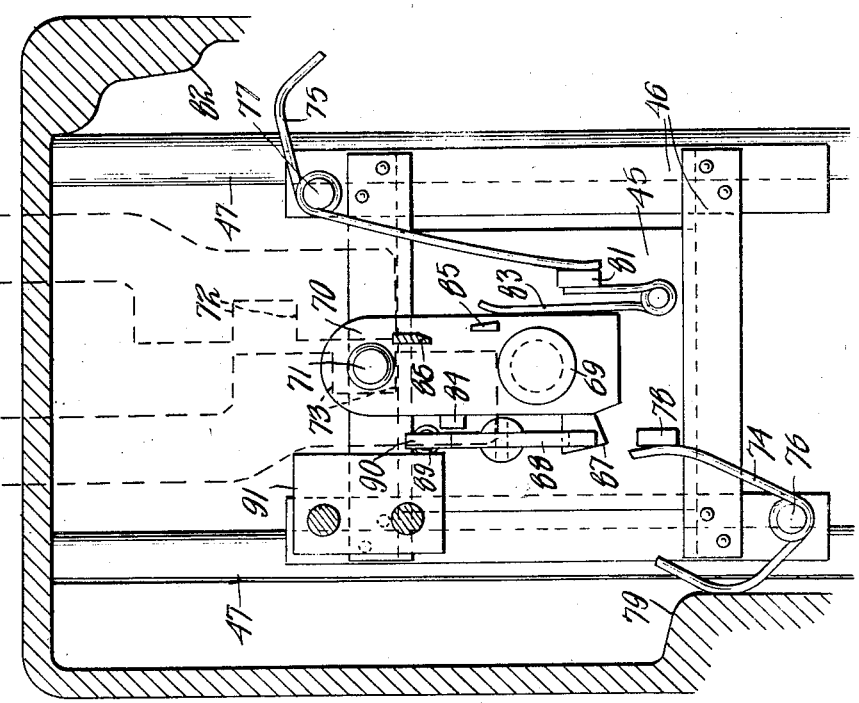
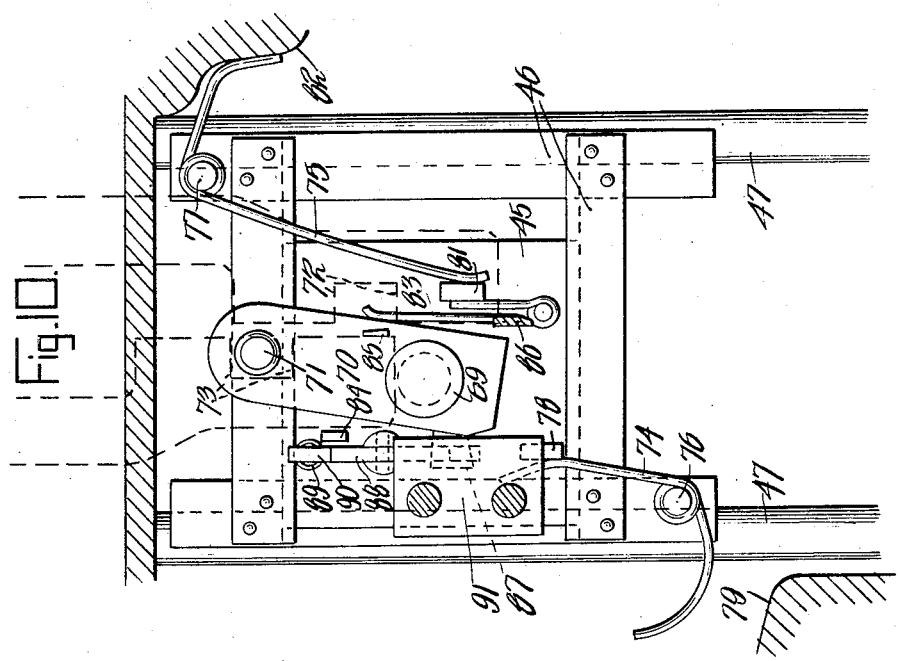
INVENTOR
Forest S. Cartwright
BY
ATTORNEY May 24, 1927.

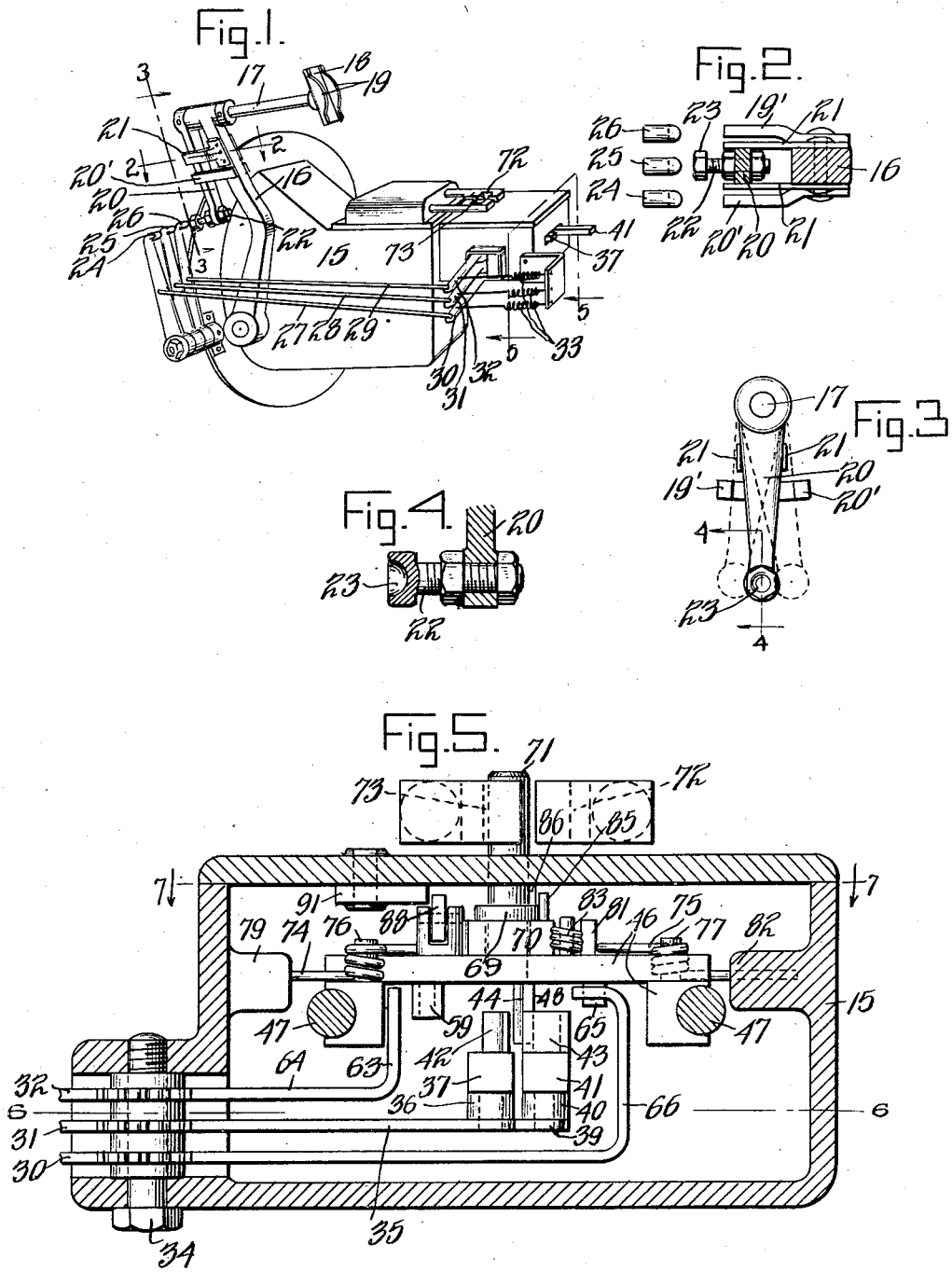

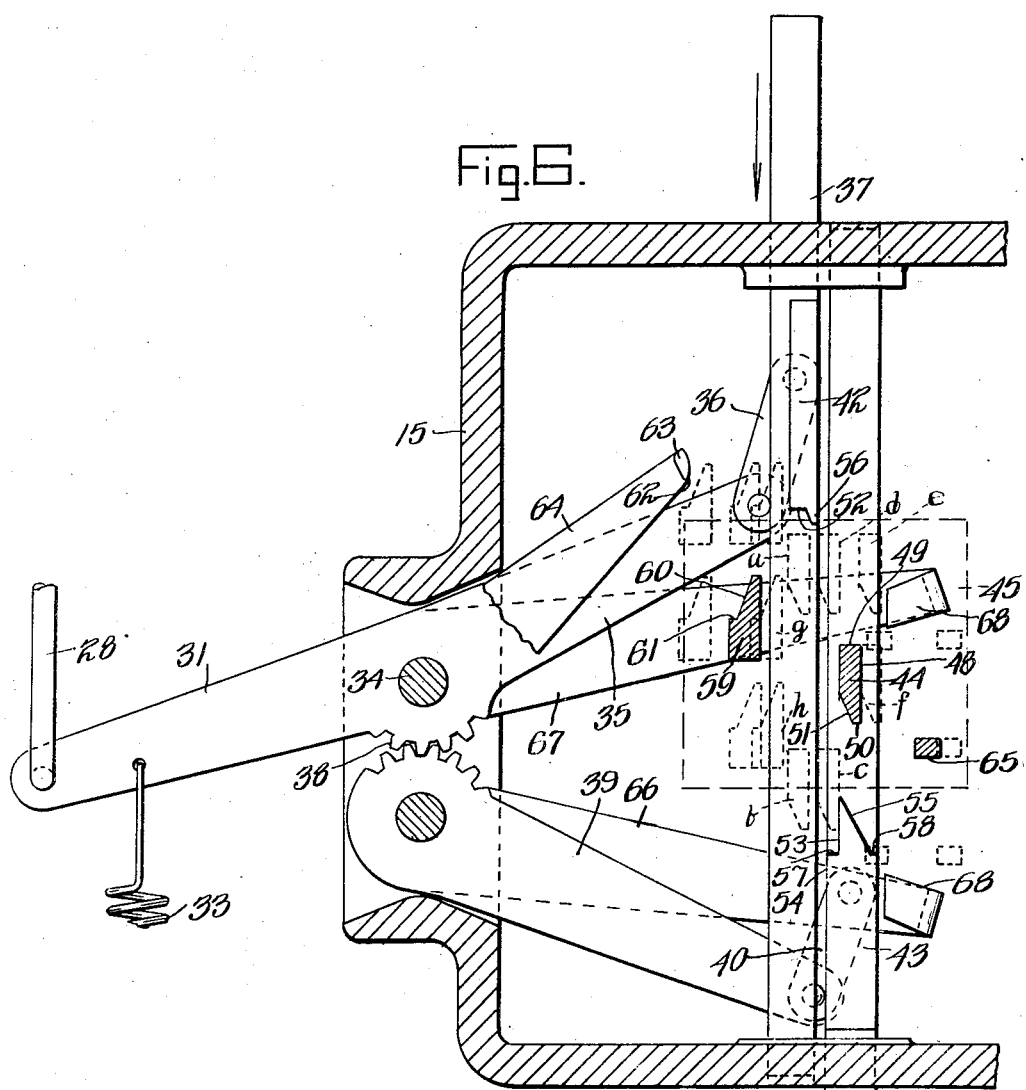

F. S. CARTWRIGHT 1,629,654

AUTOMATIC GEAR SHIFT FOR AUTOMOBILES

Filed Nov. 6, 1925

5 Sheets-Sheet 5.

Fig.11.

INVENTOR
Forest S. Cartwright
BY
ATTORNEY

Patented May 24, 1927.

1,629,654

UNITED STATES PATENT OFFICE.

FOREST S. CARTWRIGHT, OF INDIANAPOLIS, INDIANA.

AUTOMATIC GEAR SHIFT FOR AUTOMOBILES.

Application filed November 6, 1925. Serial No. 67,450.

My invention relates to an automatic gear shift for automobiles and the principal object of the invention is to provide means for changing gear positions in a conventional motor vehicle transmission having low speed ratio gears, intermediate speed ratio gears, a direct drive clutch, and reversing gears, said means being for the minimizing of the driver's physical and mental effort in making what constitutes the majority of his gear shifting.

My device makes use of the clutch pedal as a controlling member. It provides means for the selection of certain gear positions, means for selecting a succession of predetermined positions, and provides means for alternating between two positions, such as between intermediate and direct, or between low and intermediate, or between low and reverse.

The construction of my invention is based on the fact that the great majority of gear shifting is from neutral to low, then intermediate, then direct, and on steep grades or in congested traffic, from direct back to intermediate, then into direct again, etc.

My device is so constructed that these successive steps will be automatically taken by pushing out of engagement the clutch (three times to arrive from neutral to direct driving position or high speed) and therewith doing away with the present necessity of also operating a gear shift lever by hand, combining the operation of foot and hand in that of the foot alone.

After arriving in direct position, any subsequent operations of the clutch pedal will shift alternately between direct and intermediate positions except as described in the following paragraph:

For changing to reverse and for coming to neutral from any speed, both of which shifts are of less frequent occurrence than the shifts for varying the forward speed, I pivot a foot rest or treadle on the clutch pedal in such a manner that said foot rest when turned to the left will, upon pushing out the clutch, cause the transmission gears to come into position for reverse, and similarly when turned to the right and pushed out, will cause the gears to come to a neutral position.

Referring to the accompanying drawings which are made a part hereof and on which similar reference characters indicate similar parts, Figure 1 is an exterior view of the device and parts as mounted on the transmission of a motor vehicle;

Figure 2, a section on line 2—2 of Figure 1;

Figure 3, a detail as seen from line 3—3 of Figure 1;

Figure 4, a section on line 4—4 of Figure 3;

Figure 5, a section on line 5—5 of Figure 1;

Figure 6, a section on line 6—6 of Fig. 5, looking upward;

Figure 7, a section on line 7—7 of Fig. 5;

Figures 8, 9, 10 and 11, sections similar to section 7 showing various positions of the parts; and Figure 12, a section on line 12—12 of Fig. 8.

In the drawings reference character 15 indicates the housing of a conventional clutch and transmission as is in common use on gasoline engine driven motor vehicles. A release shaft upon which is mounted the clutch release mechanism projects from housing 15 and is operated by a pedal 16 mounted on its outer end. Pivoted in pedal 16 at its upper end is a shaft 17 on one end of which is a foot rest 18. This foot rest 18 is provided with lugs 19 for engaging the side of the operator's foot when it is desired to turn the same for the purpose heretofore mentioned. The turning of the shaft 17 swings a selecting arm 20 to one side or the other, lever 20 being normally held in neutral or mid-position by a pair of springs 21 secured to pedal 16 and having its outward movement limited by a pair of stops 19' and 20'.

In the lower end of lever 20 is an adjustable screw 22 the head of which is cupped out forming a socket 23 (see Fig. 4) which engages the pointed end of one of three levers 24, 25 and 26. Levers 24, 25 and 26 are conveniently mounted on housing 15 and in such a manner that when they are engaged by the selecting arm 20 and depressed, they pull on rods 27, 28 and 29, the rear ends of which are attached to operating levers 30, 31 and 32. Levers 30, 31 and 32 are provided with springs 33 for their return to the position shown in Figs. 1 and 6.

The mechanism so far described constitutes foot-operated or manually-operated controlling mechanism in so far as it is that much of my device which does not operate in an automatic manner. The automatic features will now be described:

Referring to Figures 5, 6 and 7, lever 31 pivoted on a bolt 34 has an inner arm 35 connected by a link 36 to a slide bar 37. Lever 31 has gear teeth 38 which mesh with teeth on a lever 39 so that lever 39 will oscillate in a direction opposite to the movement of lever 31. Lever 39 is connected by a link 40 to another slide bar 41. By pulling on lever 31 the slide bars are caused to move in opposite directions and by means of a lug 42 on bar 37 and a lug 43 on bar 41 striking a lug or abutment 44 forming a part of a table 45 the table 45 is moved in various directions as hereinafter described. Table 45 is mounted in a frame 46 so that it may slide crosswise therein and frame 46 is carried in turn on a pair of rails 47 so that it may slide lengthwise along the rails thereby permitting table 45 to be moved to any position within its range.

The lug or abutment 44 on table 45 has working faces 48, 49, 50 and 51, while the lugs 42 and 43 on the slide bars 27 and 41 respectively are provided with working faces 52, 53, 54 and 55. Lug 42 also has a projecting nose 56 and lug 43 has a pair of shoulders 57 and 58. The table 45 is further provided with a lug 59 having a useful face 60 and a shoulder 61 for engagement by the point 62 of a lateral lug 63 on the inwardly extending arm 64 of the lever 32. The lug 44 on the table is located between the lug 59 and another lug 65 which lug takes part in the operation of the table, this lug being operated by rock arms 66 and 67 having faces on their reversely bent free ends 68 for engagement with adjacent faces of the lug 65, arm 67 being part of lever 30 and having teeth engaging teeth on arm 66.

The table 45 carries a pivot 69 having a rockarm which may be integral with the pivot if desired. The rockarm carries a finger 71 at its free end which finger is adapted to engage between pairs of jaws indicated respectively at 72 and 73, said jaws being formed on a pair of gear shifting rods of well-known construction.

It will be recalled that the table 45 is moved endwise by engagement of various operating devices with lugs 44, 59 and 65, such movement being positive. In the positive movement of the table in a direction determined by the guide rods 47 the frame 46 moves along said guide rods said frame being impelled by the table which is carried by the frame. In the neutral position of the table illustrated in Figure 7 the table is held in central position by means of springs 74 and 75 having coiled portions encircling pivots 76 and 77. Spring 74 has free end portions engaging respectively with a lug 78 on the table and a cam 79 on the transmission housing, while the spring 75 has an arm engaging a lug 81 on the table and another arm engaging a cam 82 on the housing.

The rockarm 70 pivoted on the table 45 is normally held in the position of Figure 7 by means of a spring 83 pressing against one side of the rockarm and holding it against a stop 84 on the table. An abutment 85 on the rockarm is adapted to engage with an abutment 86 on the stationary housing 15.

The rockarm has a finger 87 positioned for engagement by a latch 88 (Fig. 12). A spring 89 is positioned under the tail of the latch for moving it into position for holding the rockarm 70 in the position illustrated in Figure 8. The tail of the latch has a cam face at 90 for engagement by a plate 91 on the housing 15 which preferably also is somewhat inclined to produce a cam operation on the face 90 for releasing the latch.

Referring now to Figures 1, 6, 7, 8, 9 and 10, the operation of the parts thus far described is as follows: The operator desiring to start the vehicle releases the power clutch by depressing clutch pedal 16 (Fig. 1) holding his foot flat on the rest 18, without turning out of normal position. In doing this, selecting arm 20 will depress rockarm 25 which pulls on rod 28 and lever 31 (Fig. 6) and by means of gear teeth 38 lever 39 will be caused to move the slide-bar 41 with its lug 43 in the direction of the arrow. The inclined face 55 of lug 43 will come in contact with the inclined face 51 of lug 44, on table 45, causing the table 45 to shift laterally or crosswise of the bars 41 (i. e. to the right hand, Figs. 6, 7 and 8) until the shoulder 58 on lug 43 comes in contact with the end 50 of lug 44. In thus moving crosswise, table 45 carries with it the selecting arm 70 and causes finger 71 to come wholly within jaws 72, finger 71 being only partly within jaws 72 while in neutral position (see Fig. 7). The further movement of bar 41 and lug 43 will then push the lug 44, table 45, selecting arm 70, finger 71, and jaws 72 and the corresponding shifter rod into a position to bring the gearing into low speed position (Fig. 8) the jaws 72 being a part of the shifting rod for changing to low and reverse positions of the gearing of an automobile or the like. As the frame 46 moves along with table 45 the spring 75 will run up on cam 82 bringing a side pressure on the table 45 so that when the lug 43 on the bar 41 is released from lug 44 on table 45, table 45 will move across to the opposite side, (see Fig. 8), it being noted that at this point there is no resistance to this motion from spring 74 as it is out of range of cam 79, and it will be seen in Fig. 8 that arm 70 assumes an angular position, the finger 71 remaining between jaws 72. The releasing of table 45 is coincident with the engaging of the clutch. The foregoing describes the action of starting the vehicle in low gear, and while thus running the pedal 16, rockarm 25, rod 28, levers 31 and 39, and slide-bars 37 and 41 are again in their original positions.

Referring now to Figures 1, 6, 8 and 9, the next step is to shift from low into intermediate gear. Pedal 16 is again depressed through the same arc of movement, still without turning foot-rest 18, which as before operates rockarm 25, rod 28, and lever 31. The inner arm 35 of lever 31 causes bar 37 and its lug 42 to slide in the opposite direction to the above-described movement of bar 41, as indicated by the arrow in Fig. 6. Face 52 of lug 42 will now engage the end 49 of lug 44, on table 45, which is now in its path, as indicated in dotted lines at $a$ in Fig. 6, causing table 45 and frame 46 to slide to the opposite end of their longitudinal range along the rods 47, the resultant position of lug 44 being indicated at $b$. While moving thus finger 71 must be transferred, while passing the middle or neutral point of the stroke, from jaws 72 to jaws 73 of the other rod, said rod controlling the engagement of gears for intermediate and high speeds. To accomplish this, selecting arm 70 is provided with a projection 85 which while said arm is in the aforesaid angular position will have in its path another projection 86 which is stationary, being fixed to or in one piece with the cover of case 15. Projection 85 being offset to one side of pivot 69 will cause finger 70 to swing over when the two projections meet, thus shifting pin 71 across into jaws 73 and leaving jaws 72 with their rod and the gearing controlled thereby in the neutral position.

It should be mentioned here that the shifting mechanism operated by the rods carrying jaws 72 and 73 is provided with suitable spring controlled self-locking devices to hold the gears in mesh or in neutral position as required until overcome by the operator. After finger 71 has entered jaws 73 the continued movement of table 45 and frame 46 will slide the intermediate gears into mesh. Spring 74 will then engage cam 79 and spring 75 being beyond the range of cam 82 the table 45 will, when the clutch pedal is again released, be caused to move crosswise a limited amount, viz, until the side 48 of lug 44 strikes face 54 of lug 43. As lug 43 slides back lug 44 will move further to the right in Fig. 6 until it rests against face 53 of lug 43, as indicated at $c$, said lug 44 having then its end 50 in the path of another shoulder 57 on lug 43. The nose 56 guards against the lug 44 slipping off the end 52 of lug 42 during the movement of the table from the position of Fig. 8 to that of Fig. 9. This, with the coincidental engagement of the power clutch brings the intermediate gearing into operation and while the vehicle is thus running the pedal 16, lever 25, rod 28, and levers 31 and 39, and bars 37 and 41 are again in their original positions.

In order to shift from intermediate to direct gear (or high gear) the pedal 16 is again depressed in the same manner as heretofore described and by the same train of parts the lug 43 is brought into motion, its shoulder 57 engaging the end 50 of the lug 44 and sliding the table 45, frame 46 and arm 70 the full length of its stroke, thus bringing lug 44 to position $d$. Finger 71 being kept between jaws 73 will cause the intermediate gear to disengage and the direct drive clutch to engage, bringing the vehicle transmission into high speed position ready for the engagement of the power clutch on release of the foot from pedal 16, and as the table slides from one end of its stroke to the other the spring 74 again becomes free whereupon spring 75 forces the table across to the position shown in Fig. 10. It will be noted that during this movement the path of projection 85 is to one side of projection 86, (see Fig. 9). From now on any further operation of pedal 16 results in shifting back and forth between direct and intermediate gear positions so long as the foot-rest 18 is held in a vertical position.

In order to shift from low, intermediate, or high speed position to neutral the foot-rest 18 is turned clockwise, view from the driver's seat, prior to the depression of the pedal until arm 20 bears against stop 20'. Cup 23 will now register with the end of rockarm 24 and cause rod 27 to pull on lever 30. Lever 30 is similar to lever 31, in having gear teeth similar to teeth 38 shown in Fig. 6, which teeth operate a lever 66 (Figs. 5 and 6) and in having a bowed inner end 68 which in conjunction with a similar part on lever 66 grips the lug 65 on the table 45 and causes table 45 to be brought to neutral or mid-position, the lug 44 moving to positions $e$ and $f$ in succession as spring 75 leaves cam 82 and spring 74 engages cam 79. The movement of table 45 and selecting arm 70 will cause the gears to be pulled out of mesh, table 45 then finding its center position by reason of the equal pressure of springs 74 and 75 (see Fig. 7) with lug 44 in the full-line position (Fig. 6).

To shift into reverse it becomes necessary to turn foot-rest 18 counterclockwise while pedal 16 is being depressed. This brings arm 20 against stop 19' and registers cup 23 with arm 26, pulling on the rod 29 and the lever 32. The lug 63 at the inner end of arm 64 now engages face 60 of lug 59 at its lower edge 62. Lug 59 is attached to table 45 and causes the table to move to the right (Fig. 6) lug 59 assuming position $g$ until the end 62 of lever 32 engages shoulder 61 when finger 71 will be moved into jaws 72, then moving table 45 lengthwise until the reverse gears are in mesh (Fig. 11) the lug 59 taking position $h$. The action of springs 74 and 75 does not necessarily affect this operation. The gears may now also be brought into neutral position as before described.

It is possible to bring the gears into neutral by simply depressing the clutch pedal part way so as to leave the table 45 in mid-position. This, however, requires a good deal of skill and does not offset the need of the mechanism described for this purpose.

The arm 70 is held in the angular position shown in Figure 8 by means of a latch 88 mounted on table 45 (Fig. 12) engaging a finger 87 on the rockarm 70 for the purpose of holding pin 74 within jaws 72 until jaws 72 are brought to neutral position while shifting from low to intermediate. Upon reaching neutral position the latch 88 is released its tail 90 striking a plate 91 on the housing 15. In all other positions latch 88 rides on top of arm 87 and does not come into action. Latch 88 is not a necessary part affecting the operation of my device and might be dispensed with, depending upon the design of jaws 72 and 73.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent is:

1. In a gear-shifting mechanism, a pair of gear shifting rods having yokes thereon, a rockarm engageable with either yoke, a table carrying the rockarm, a pair of slide bars, coacting abutments on the slide bars and the table for reciprocating the table, means for reciprocating the table in another direction, means for oscillating the rockarm, and manually operated levers for selectively shifting said slide bars, substantially as set forth.

2. In a gear-shifting mechanism, a pair of gear shifting rods having yokes thereon, a rockarm engageable with either yoke, a table carrying the rockarm, and means for moving the table and the rockarm selectively to engage the rockarm with one or the other of said shifters and move the same, substantially as set forth.

3. In a gear-shifting mechanism, a pair of gear shifting rods having yokes thereon, a rockarm engageable with either yoke, a table carrying the rockarm, means for moving the table and the rockarm selectively to engage the rockarm with one or the other of said shifters and move the same including manually operable levers, and abutments on the table engageable by said levers, substantially as set forth.

4. In a gear-shifting mechanism, a pair of gear shifting rods having yokes thereon, a rockarm engageable with either yoke, a table carrying the rockarm, means for moving the table and the rockarm selectively to engage the rockarm with one or the other of said shifters and move the same including slide-bars, coacting abutments on the table and the slide bars, and means actuating the slide bars, substantially as set forth.

5. In a gear-shifting mechanism, a pair of gear shifting rods having yokes thereon, a rockarm engageable with either yoke, a table carrying the rockarm, means for moving the table and the rockarm selectively to engage the rockarm with one or the other of said shifters and move the same including an abutment on the rockarm, and a spring adapted to bear against said abutment to move said rockarm, substantially as set forth.

6. In a gear-shifting mechanism, a pair of gear shifting rods having yokes thereon, a rockarm engageable with either yoke, a table carrying the rockarm, a frame carrying the table, means for reciprocating the table in one direction, means for reciprocating the frame in another direction, and means for swinging the rockarm on the table into engagement with one of said yokes, substantially as set forth.

7. In a gear-shifting mechanism, a pair of gear shifting rods having yokes thereon, a rockarm engageable with either yoke, a table carrying the rockarm, a frame carrying the table, means for reciprocating the table in one direction including cams on a fixed frame portion, springs on the table coacting with said cams, means for reciprocating the frame in another direction, and means for swinging the rockarm on the table into engagement with one of said yokes, substantially as set forth.

8. In a gear-shifting mechanism, a pair of gear shifting rods having yokes thereon, a rockarm engageable with either yoke, a table carrying the rockarm, a frame carrying the table, means for reciprocating the table in one direction including cams on a fixed frame portion, springs on the table coacting with said cams, means for reciprocating the frame in another direction including manually operated selective levers, coacting abutments on the levers and the table, and means for swinging the rockarm on the table into engagement with one of said yokes, substantially as set forth.

9. In a gear-shifting mechanism, a pair of gear shifting rods having yokes thereon, a rockarm engageable with either yoke, a table carrying the rockarm, a frame carrying the table, means for reciprocating the table in one direction including cams on a fixed frame portion, springs on the table coacting with said cams, means for reciprocating the frame in another direction including manually operated selective levers, coacting abutments on the levers and the table, means for swinging the rockarm on the table into engagement with one of said yokes including an abutment on the rockarm, and a coacting spring on the reciprocating frame, substantially as set forth.

10. In a gear-shifting mechanism, a pair of gear shifting rods having yokes thereon, a rockarm engageable with either yoke, a table carrying the rockarm, a frame carrying the table, means for reciprocating the table in one direction, means for reciprocating the frame in another direction, means for swinging the rockarm on the table into engagement with one of said yokes, a latch on the table for locking the rockarm in one position at certain times, and means on the frame for releasing said latch, substantially as set forth.

11. In a mechanism to select and shift gears for use with a pedal reciprocable to disconnect a clutch, the combination of a foot-rest for the pedal pivoted with the axis of the pivot substantially parallel to the direction of the reciprocation, slide bars to shift the gears, a table associated with said slide bars, latches on said table, a member engageable by said latches for operating said slide bars and a plurality of manually operable connections for operating said table, each connection differently modifying the action of the latches and the pivotal position of the foot-rest determining the choice of connection, substantially as set forth.

12. A selective mechanism as specified in claim 11 in which one connection will cause the latches to select a series of gears on successive reciprocations of the pedal while another of said connections will cause the latches to select one definite gear, substantially as set forth.

In witness whereof, I have hereunto set my hand at Indianapolis, Indiana, this 29th day of September, A. D. nineteen hundred and twenty-five.

FOREST S. CARTWRIGHT.